United States Patent

[11] 3,607,065

| [72] | Inventors | Glenn J. Forseth;<br>Archie G. Smith, both of Borger, Tex. |
|---|---|---|
| [21] | Appl. No. | 767,052 |
| [22] | Filed | Sept. 30, 1968 |
| [45] | Patented | Sept. 21, 1971 |
| [73] | Assignee | Phillips Petroleum Company<br>Continuation-in-part of application Ser. No. 515,139, Dec. 20, 1965, now abandoned. |

[54] PRODUCTION OF CARBON BLACK
6 Claims, 5 Drawing Figs.

[52] U.S. Cl. ............................................. 23/209.4,
23/259.5
[51] Int. Cl. ............................................. C09c 1/50
[50] Field of Search........... ............................ 23/209.4,
209.6, 259.5

[56] References Cited
UNITED STATES PATENTS

| 2,368,827 | 2/1945 | Hanson et al. ............... | 23/259.5 |
| 2,564,700 | 8/1951 | Krejei........................... | 23/209.4 |
| 3,322,506 | 5/1967 | Wempe et al................. | 23/259.5 |
| 3,355,247 | 11/1967 | Krejci et al. ................. | 23/209.4 |

Primary Examiner—Edward J. Meros
Attorney—Young & Quigg

ABSTRACT: Process and apparatus for the production of carbon black by the pyrolytic decomposition of a hydrocarbon feed wherein the hydrocarbon feed is dispersed by impingement on a screen spaced apart from the feed nozzle in an oxygen-containing gas and the resulting mixture commingled with hot combustion gases whereby the hydrocarbon feed is pyrolytically decomposed to carbon black. Vaporous fuel is preferably introduced into admixture with the oxygen-containing gas.

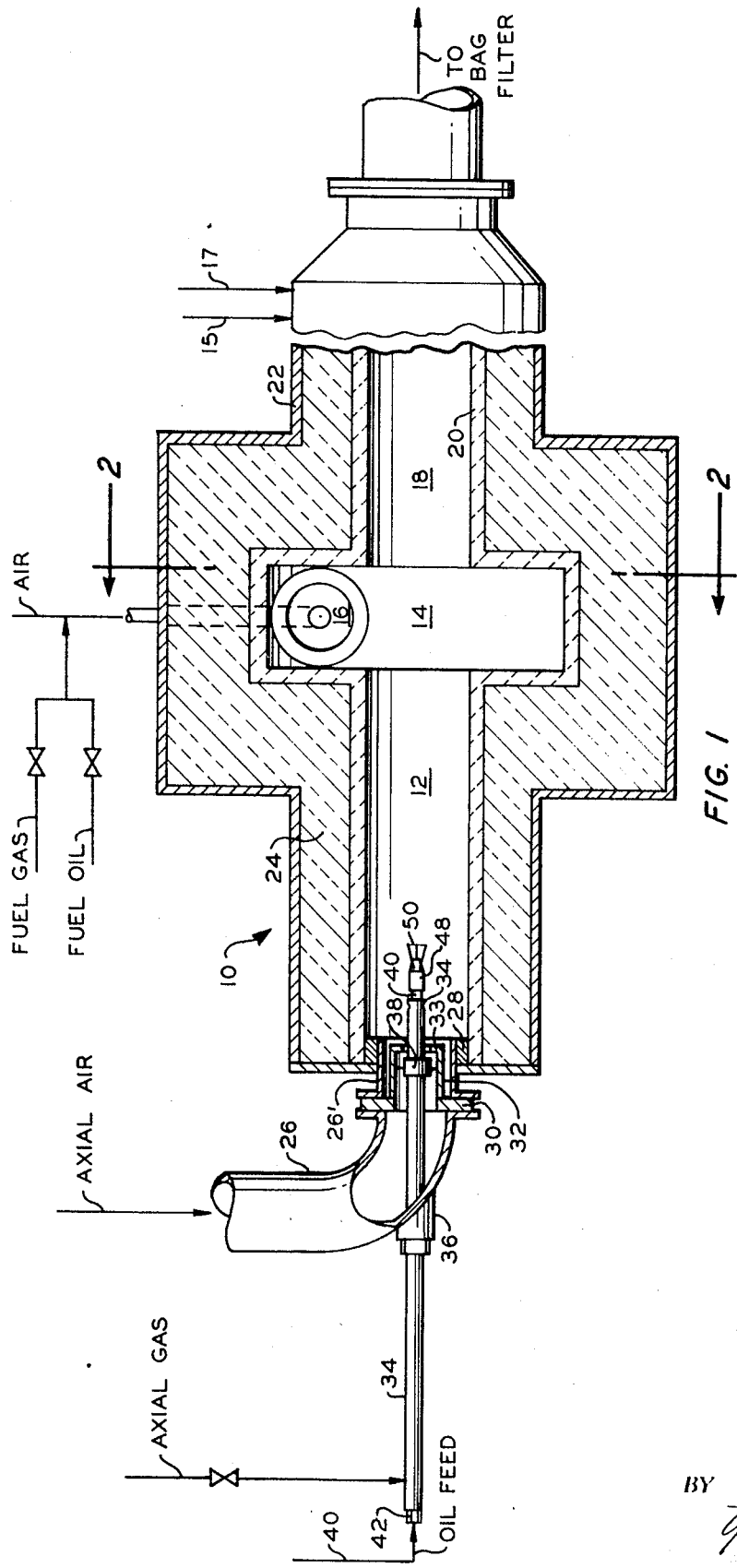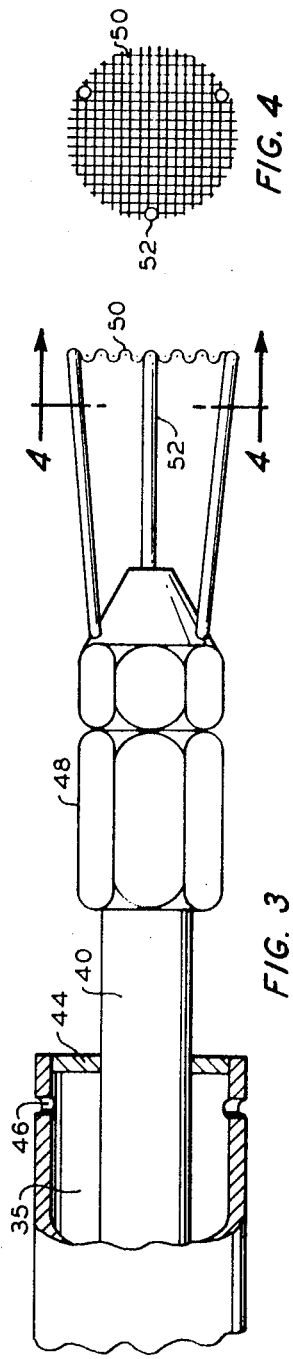

PRODUCTION OF CARBON BLACK

This is a continuation-in-part of my application Ser. No. 515,139, filed Dec. 20, 1965 now abandoned.

This invention relates to a method and an apparatus for producing carbon black.

For several years carbon black has been produced in large quantities in furnaces. The larger part of the carbon black produced today is used as a reinforcing agent for rubber. By far the larger part of the compounded rubber material containing carbon black is designed specifically for tire treads or tire carcasses. The state of the rubber compounding art has advanced to such a degree that the properties of the carbon black used in such compounding must be controlled with narrow limits. Such a control of all of the desired properties of the carbon black is oftentimes difficult to achieve.

One of the most important properties of a carbon black when used in the compounding of rubber for use in tire manufacturing is commonly referred to as "structure." There is a good correlation between the structure of a carbon black and the modulus of a rubber product compounded with said carbon black. Other properties being comparable, high structure carbon blacks normally yield high modulus rubber and low structure carbon blacks normally yield low modulus rubber.

By the term "structure," as applied herein to carbon black, is meant characteristics of the carbon black particles which relate to flocculation of said particles. The structure is said to be high when there is a strong tendency for the particles to form chains of particles. Conversely, the structure is said to be low when there is little tendency to form such chains. While the classifications are all relative, the carbon blacks of commerce can be classified generally as "high structure," "normal structure," and "low structure."

Furnace carbon blacks having high structure characteristics have several advantages in the compounding of rubber. For example, they are "easy processing," i.e., are readily compounded into the rubber. Another advantage is that rubber compounded with high structure carbon blacks possesses superior extrusion properties. For many of the applications where high structure furnace blacks are preferred, it would be desirable to have carbon blacks of higher structure than can normally be produced by furnace processes.

Thus, it would be desirable to have a furnace carbon black process wherein the structure of the carbon black product can be controlled and/or varied to meet market demands. In copending application Ser. No. 560,493, filed June 27, 1966, there is disclosed and claimed such a process and an apparatus which can be employed for carrying out said process. The present invention provides an improvement over the invention of said copending application. Broadly speaking, the present invention provides and improvement in the introduction of the hydrocarbon feedstock from which the carbon black is produced.

An object of the invention is to provide valuable carbon blacks and improved methods of making same. Another object of this invention is to provide an improved process for the production of furnace carbon blacks wherein the structure characteristics of the carbon black product can be controlled. Another of this invention is to provide an improved process for producing a furnace carbon black having decreased structure characteristics of oil absorption values. Still another object of this invention is to provide an improved process for making a furnace carbon black, from a given hydrocarbon feedstock, having higher structure characteristics than the carbon black which normally would be produced from said hydrocarbon feedstock. Another object of this invention is to provide an improved furnace carbon black process wherein the properties of the carbon black product can be regulated and controlled so as to satisfy prescribed and predetermined requirements. Another object of this invention is to provide an improved apparatus for the production of carbon black. Other aspects, objects, and advantages of the invention will be apparent to those skilled in the art in view of this disclosure.

Thus, according to the present invention, there is provided a feedstock nozzle assembly comprising: a spray nozzle; and an impingement baffle means mounted on, in spaced apart relationship downstream from the outlet of and in the discharge path of, said nozzle.

Also, according to the present invention, there is provided a carbon black producing process in which a liquid hydrocarbon feed is dispersed in a vaporous reactant to form a multiphase mixture which is subsequently increased in velocity with the liquid being further dispersed in the multiphase mixture, after which the mixture is conducted into a reaction zone wherein the hydrocarbon is vaporized, the mixture then being subjected to carbon black forming conditions.

The free oxygen-containing gas most commonly used in the practice of the invention is air. Air is usually preferred for convenience and for economical reasons. However, said free oxygen-containing gas can be air enriched with oxygen, essentially pure oxygen, or mixture of oxygen with other gases. For convenience, the invention will be further described in terms of using air as the free oxygen-containing gas. However, it is to be understood that the invention is not limited to the use of air.

In one preferred embodiment of the invention of said copending application, a stream of a vaporous fuel is introduced into admixture with an axially or longitudinally flowing stream of air in a first combustion chamber at a point upstream from the point of introduction of the hydrocarbon feedstock. In another and sometimes more preferred embodiment of said invention, the introduction of said vaporous fuel into said first combustion chamber is omitted and said stream of air or other free oxygen-containing gas which is introduced tangentially into a second combustion chamber comprises a stream of hot combustion gases resulting from the substantially complete combustion of a combustible mixture of a fuel with an excess of air introduced into a tunnel combustion chamber communicating tangentially with said second combustion chamber. In the presently most preferred embodiment of said invention, said stream of vaporous fuel introduced into said first combustion chamber is introduced into admixture with the axially or longitudinally flowing stream of air therein, and said stream comprising air or other free oxygen-containing gas which is introduced tangentially into said second combustion chamber comprises a stream of hot combustion gases produced as previously described.

It will be noted that in all the above-described embodiments of the invention of said copending application a stream of air or other free oxygen-containing gas is introduced axially or longitudinally into said first combustion chamber, and a stream comprising air or other free oxygen-containing gas is introduced tangentially into said second combustion chamber. It has been discovered that the amount of said axially introduced stream of air relative to the total amount of air introduced into the process (both the first and second combustion chambers) has a definite effect on the structure characteristics of the carbon black product. Generally speaking, as the amount of said axially introduced air increases, the structure characteristics of the carbon-black product also increase, i.e., there is obtained a carbon black product having a higher structure. Thus, in the practice of said invention, it is presently preferred to use an amount of axially introduced air which is within the range of from 10 to 70, more preferably within the range of from 15- to 60-volume percent of the total air introduced into the process.

It has also been discovered that the point of introduction of the hydrocarbon feedstock or reactant into the first combustion chamber has a definite effect on the structure characteristics of the carbon black product. Generally speaking, as the point of introduction of said feedstock into said first combustion chamber is moved upstream from the entrance to said second combustion chamber, there is obtained an increase in the structure characteristics of the carbon black product. Thus, in the practice of the invention of said copending application, it is presently preferred to introduce said hydrocarbon feedstock into said first combustion chamber at a point which, in distance upstream from the entrance to said second combustion chamber, is within the range of from 0.25 to 2.1, more preferably 0.5 to 1.7, times the diameter of said first combustion chamber. However, it is within the scope of said invention to introduce the hydrocarbon feedstock into said first combustion chamber at a point which, in distance upstream from the entrance to said second combustion chamber, is more than 2.1 times the diameter of said first combustion zone. In some instances in the practice of the invention of said copending application, there is a tendency for deposition of carbon to occur in said first combustion chamber when said hydrocarbon feedstock is introduced in liquid or only partially vaporized state and when the point of introduction of said hydrocarbon feedstock therein is moved upstream from the entrance to said second combustion chamber more than about 2.5 times the diameter of said first combustion chamber. The present invention provides a means for overcoming this problem and eliminating said deposition of carbon when it occurs.

As indicated above, the introduction of a vaporous fuel into said first combustion chamber is not essential in the practice of the invention. A primary effect or result from so using a vaporous fuel is an increase in the yield of carbon black product. Thus, for economic reasons, in most instances it will be preferred to use a vaporous fuel in the first combustion chamber. When such a vaporous fuel is so used, the amount used will depend upon the amount of air introduced axially into said first combustion chamber. The amount of vaporous fuel so used will usually be an amount such that the oxygen in the axially introduced air or other free oxygen-containing gas will be within the range of from 150 to 500 percent of the stoichiometric amount needed for complete combustion of said vaporous fuel. Preferably, said amount will be within the range of 110 to 150 percent of stoichiometric. However, the invention is not limited to using said vaporous fuel, or any particular amount thereof, and amounts less than stoichiometric can be used. Thus, the invention is not limited to obtaining complete combustion of said vaporous fuel is said first combustion chamber.

FIG. 1 is a diagrammatic illustration, partly in cross section, of one type of carbon black furnace in accordance with the present invention.

FIG. 3 is a view partly in cross section, illustrating a detail of the apparatus of FIG. 1.

FIG. 4 is a cross section taken along the lines 4—4 of FIG. 3.

Figure 2:
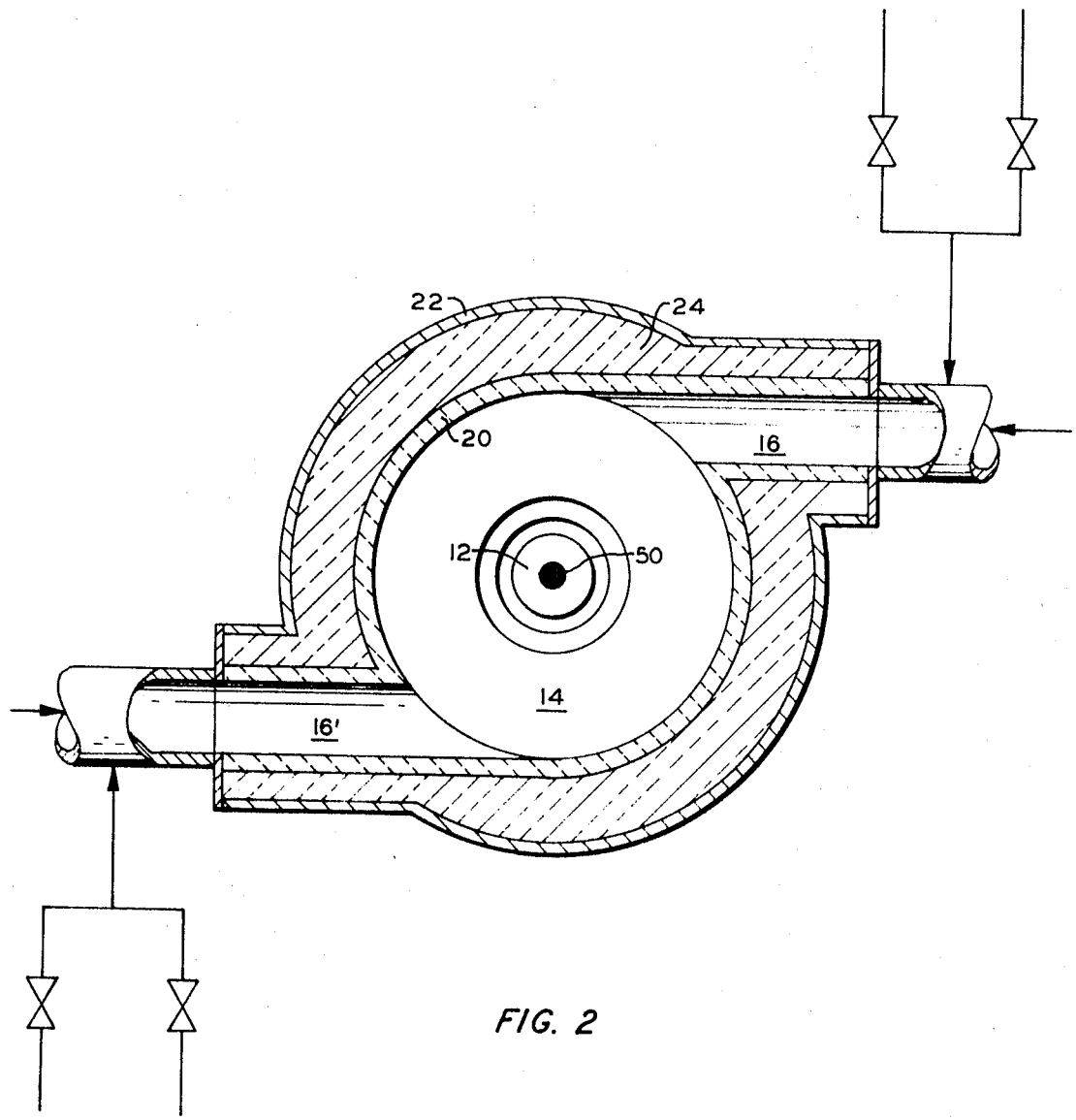
FIG. 2 is a cross section taken along the lines 2—2 of FIG. 1.

Referring now to the drawings, wherein like reference numerals are employed to denote like elements, the invention will be more fully explained. In FIG. 1 the furnace, designated generally by the reference numeral 10, comprises a first generally cylindrical combustion chamber 12 having a length greater than its diameter. A second generally cylindrical combustion chamber 14 having a diameter greater than its length and greater than the diameter of said first combustion chamber 12 is connected at its upstream end to the downstream end of said first combustion chamber in axial alignment and open communication therewith. At least one inlet tunnel 16 communicates tangentially with said second combustion chamber 14. A third generally cylindrical combustion chamber 18 having a length greater than its diameter and a diameter less than the diameter of said second combustion chamber 14 is connected at its upstream end to the downstream end of said second combustion chamber. All of said three combustion chambers have a refractory lining 20 made of a highly refractory material such as sillimanite, alumina, or other refractory material suitable for the purpose. A steel shell 22 containing insulating material 24 surrounds said refractory liner 20.

It is not essential that the downstream end portion of said chamber 18 have a constant diameter as illustrated. If desired, the downstream end portion of said chamber 18 can be provided with an enlarged diameter so as to provide increased residence time under carbon black-producing conditions without unduly increasing the length of said chamber For example, the upstream portion of chamber 18 can have an inner diameter of 12 inches and any suitable length, e.g., up to 10 or 11 feet and the downstream portion of said chamber can have an inner diameter of 18 inches and any suitable length, e.g., up to 10 or 11 feet. Since 1 foot of the 18-inch I.D. portion equals 2.25 feet of the 12-inch portion, insofar as volume is concerned, it is clear how the overall effective length can be varied. The combustion chamber 14 can be 12 inches in length and have a diameter of 37 inches. The combustion chamber 12 can be 45 inches in length and have a diameter of 12 inches. The above dimensions are not critical, are merely given as an example, and any and all dimensions can be varied in the practice of the invention. However, when employing a precombustion type of furnace as illustrated in FIG. 1, the second combustion chamber 12 and larger than said third chamber 18.

Whereas, the present invention will be described with reference to the above-described and illustrated reactor, it is to be emphasized that the practice of the method of this invention can be carried out in any reactor conventionally employed to produce carbon black, and with any conventional feedstock.

A first fluid (air) introduction conduit is connected to the upstream end of said first combustion chamber 12. As here illustrated, said first conduit comprises two sections 26 and 26'. Disposed between the outer wall of said section 26' and the inner wall of said first combustion chamber 12 is a sleeve 28, here shown as being made of metal but which in some instances can be preferably formed from a ceramic material. As shown, the outlet end of said first conduit 26, 26' extends into first combustion chamber 12 and the inlet end of said first conduit is connected to a source of air supply. A flange bushing 30, having a sleeve 32 attached to the downstream face thereof is disposed between said sections 26 and 26' of said first conduit.

A second fluid (vaporous fuel) introduction conduit 34 is positioned longitudinally and preferably axially within said first conduit for at least a portion of its length and the outlet end of said second conduit 34 extends beyond the outlet end of said first conduit, i.e., section 26', and into said first combustion chamber 12. As here shown, the inlet end of said second conduit 34 extends through a wall of section 26 of said first conduit and through a packing gland assembly 36 which provides means for slidably moving said second conduit 34 and thus changing the position of its outlet end within said first combustion chamber 12. Said second conduit 34 is supported in its longitudinal position within sleeve 32 by means of a loosely fitting collar 38 which is supported from the inner wall of said sleeve by the plurality of rods shown, or by any other suitable means.

A third fluid (hydrocarbon feedstock) introduction conduit 40 is positioned longitudinally and preferably axially within said second conduit 34 which its outlet and extending beyond the outlet end of said second conduit 34. A second packing gland means 42 is mounted on the inlet end portion of said second conduit 34, and the inlet end of said third conduit 40 extends therethrough to provide means for slidably moving said third conduit thus changing the position of its outlet end within said first combustion chamber 12 and with respect to the outlet end of said second conduit 34.

The outlet end of said second conduit 34 is closed by a closure means 44 (see FIG. 3), here shown to be a washer or annular member positioned at the end of said second conduit 34 and between same and the outer wall of said third conduit 40. Any other suitable means can be provided for closing the outlet or downstream end of said second conduit 34. A plurality of radially disposed openings 46 is provided circumferentially around the downstream end portion of said second conduit 34 adjacent said closure means 44. A nozzle means 48 is disposed on the outlet end of said third conduit 40 for directing the hydrocarbon feedstock or reactant into the longitudinally flowing stream of air in first combustion chamber 12. Any suitable nozzle means adapted to introduce said hydrocarbon feedstock at any suitable angle, either in vaporous, partially vaporized, or liquid state, can be employed in the practice of the invention. One such suitable nozzle is that illustrated in FIGS. 1 and 2 of U.S. Pat. No. 2,809,098. Usually the angle of introduction of said feedstock into said airstream will be within the range of 15 to 75, preferably 20 to 60, degrees. However, it is within the scope of the invention to employ spray angles outside said ranges.

A baffle means is positioned downstream from and in relatively close proximity to the outlet of said nozzle means 48. As here illustrated, said baffle means comprises a screen 50 mounted on, in spaced apart relationship downstream from the outlet of and in the discharge path of, said nozzle means 48 by means of a plurality of rods 52. Said screen serves as as impingement baffle for the hydrocarbon feedstock and apparently aids in the atomization and/or dispersion of said feedstock into the longitudinally flowing stream of free oxygen-containing gas.

The diameter of screen 50 and the distance it is positioned downstream from the outlet of nozzle 48 will depend to a large extent upon the diameter of first combustion chamber 12 and the spray angle of nozzle 48. For example, in a reactor where first combustion chamber 12 has a diameter of 12 inches and spray nozzle 48 has a spray angle of 30 degrees, it is preferred that screen 50 have a diameter of about 1.1 to about 1.7 inches and be positioned downstream from the outlet of nozzle 48 a distance within the range of about 1.5 to about 2.5 inches. It is desirable that the area of screen 50 be substantially completely blanketed with the hydrocarbon feedstock to protect it from the heat in combustion chamber 12. Said screen 50 can be fabricated from any suitable mesh screen, e.g. about 18 mesh per inch, 25-gauge, type 316 stainless steel.

When the vaporous fuel introduction conduit 34 and hydrocarbon feedstock introduction conduit 40 are withdrawn into the upstream end portion of first combustion chamber 12, and when it is desired to insure that complete combustion of said vaporous fuel occurs in said combustion chamber 12, an orifice 33 can be provided on the downstream end of sleeve 32 to anchor the flame to reduce the flow of air from sleeve 32 which is normally open.

In the operation of a presently more preferred embodiment of the present invention, a combustible mixture of a fuel and air is introduced into at least one of tangential inlet tunnels 16 and 16' which communicate tangentially with second combustion chamber 14. The fuel was in forming said combustible mixture can be any suitable fuel, either liquid, solid, or gaseous. Generally speaking, a gaseous fuel such as natural gas is preferred. Liquid hydrocarbon fuels are the next most preferred fuel. Any suitable means can be employed for introducing said combustible mixture into inlet tunnels 16 and 16', e.g., that shown in U.S. Pat. No. 2,780,529. Burning of said combustible mixture is initiated and substantially completed in inlet tunnels 16 and/or 16'. Any portion of said mixture which is not burned in said inlet tunnel is burned along the periphery of second combustion chamber 14. Upon continued injection of combustible mixture into said inlet tunnels 16 and/or 16', the resulting combustion mixture (flame and combustion products) exiting therefrom enters second combustion chamber 14 and follows a spiral path around same toward the axis thereof. When the spiral becomes less than the diameter of third combustion chamber 18, the gaseous flow changes from a spiral to a helical form, and following this latter pattern enters said third chamber 18.

A stream of air is introduced via said first conduit 26, 26' into and flows longitudinally in first combustion chamber 12. A stream of vaporous fuel, e.g., natural gas or a vaporized normally liquid fuel, is passed through the annular space 35 (see FIG. 3) between second conduit 34 and third conduit 40 and exits substantially radially therefrom via openings 46 into admixture with said longitudinally flowing stream of air in first combustion chamber 12. Said vaporous fuel can be obtained from any suitable source. As indicated, normally gaseous hydrocarbons are preferred. Another convenient and economical fuel gas is the tail gas from the carbon black recovery equipment. Said tail gas is high in hydrogen content. If desired, said tail gas can be enriched to increase its B.t.u. content by passing same through a light oil scrubber as described in U.S. Pat. No. 2,781,246 (1957) to W. A. Goldtrap. A portion of the light oil vaporizes and enriches the gas. Said tail gas and enriched tail gas can also be used as fuel in tunnels 16 and 16'.

A reactant hydrocarbon oil, from a source not shown, is usually passed through a preheater, also not shown, and then passes through said third conduit 40, nozzle 48, and is introduced at a suitable angle into contact with impingement screen 50 and then into the mixture of vaporous fuel and air in said first combustion chamber 12. The resulting admixture is then passed axially through said second combustion chamber 14 and enters third combustion chamber 18 while surrounded by the hot combustion gases from said second combustion chamber 14. Formation of the carbon black product is completed in chamber 18, and passes therefrom suspended in combustion gases to carbon black recovery equipment (not shown). However, before leaving said chamber 18 the reaction mixture (smoke) is quickly cooled to a temperature below that at which carbon black formation takes place. This cooling is effected in known manner by means of water introduced via conduits 15 or 17 which are here shown diagrammatically but which extend to the interior of chamber 18 in known manner.

In another preferred embodiment of the invention the operation is substantially the same as that described in the previous paragraph except that the introduction of the vaporous fuel through conduit 34 is omitted.

In another presently less preferred embodiment of the invention, a stream of axial air is introduced via conduits 26, 26', a stream of vaporous fuel is introduced via conduit 34, and a stream of hydrocarbon reactant is introduced via conduit 40, all as previously described. However, no fuel is used in inlet tunnels 16 and/or 16' and only a stream of air is introduced therethrough.

It is also within the scope of the invention to operate the embodiment thereof described in the immediately preceding paragraph without the introduction of said stream of vaporous fuel through second conduit 34.

At present it is now known for certain whether or not any carbon black is actually formed in said first combustion chamber 12. However, while it is not intended to limit the invention by any theories as to reaction mechanisms, it is presently believed that formation of the carbon black product is at least initiated, i.e., the first step or steps toward formation of said carbon black product occur in said first chamber, formation of the carbon black product is probably at least carried forward in said second combustion chamber 14, and is probably completed in said third chamber 18. Thus, in the overall process, said carbon black product is formed by pyrolytic decomposition and/or partial burning of the hydrocarbon feedstock under carbon black-producing conditions in said first, second, and third chambers.

The following examples will serve to further illustrate the invention The test runs set forth in said examples were carried out in a commercial size carbon black furnace or reactor embodying the essential features of the reactor illustrated in FIG. 1. In the reactor employed, first combustion secton 12 was 12 inches in diameter and 45 inches in length. Second combustion section 14 was 37 inches in diameter and 12 inches in length. Tunnels 16 and 16' were 12 inches in diameter and approximately 24 inches in length along the short side thereof. Third combustion section 18 was 12 inches in diameter. The outlet of nozzle 48 was approximately 3¼ inches downstream from openings 46. The above dimensions are given by way of example only, are not limiting on the invention, and any and all can be varied within the scope of the invention.

EXAMPLES

A pair of test runs were carried out substantially in the manner described above for the "more preferred embodiment of the present invention," except that no fuel was used in inlet tunnels 16 and 16'. The hydrocarbon feedstock in both of said runs was the same, a commercial aromatic concentrate oil obtained by the liquid sulfur dioxide extraction of cycle oils. In both of said runs the outlet of nozzle 48 was approximately 42 inches upstream from the entrance to second combustion chamber 14. Other operating conditions, e.g., oil charge rate, oil rates, oil preheat temperature, etc., were essentially the same in both runs. In Run No. 1 no impingement screen was employed downstream from the outlet of nozzle 48. In Run No. 2 an impingement screen 1.12 inches in diameter was positioned 1.5 inches downstream from the outlet of and in the discharge path of said nozzle 48. The spray angle of nozzle 48 was 30 degrees.

In both Run No. 1 and Run No. 2 the structure of the carbon black product was greater than that for the carbon black product normally obtained from said feedstock when operating in accordance with the prior art, e.g., in accordance with the teachings of U.S. Pat. 2,564,700. However, in Run. No. 1 there was a significant deposition of carbon in first combustion chamber 12, whereas in Run No. 2, after a substantially equal period of operation, there was essentially no deposition of carbon.

The following two examples further indicate the operation of the method of this invention.

In both instances, the make-oil was ejected from a nozzle having a 0.125' circular opening, equivalent to an area of 0.0122 square inches, in the form of a cone, the spray angle of the cone being 30°. Impingement of the liquid hydrocarbon was made on an 18-mesh, 25-gauge screen located 1.5 inches from the nozzle exit, the impingement area of the cone on the screen being 0.67 square inches, the screen area being 0.985 square inches, the screen having a free area of 0.296 square inches.

Figure 5:
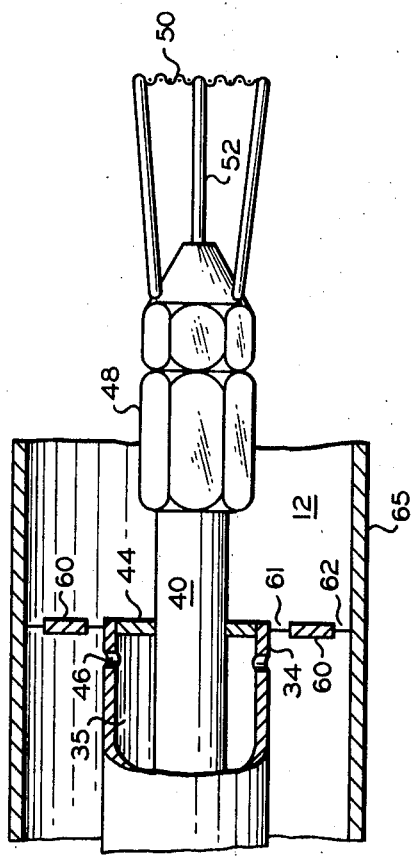
FIG. 5 is a modification of the apparatus shown in FIG. 4.

Peripheral to closure means 44, and as shown in FIG. 5, there was installed doughnut-shaped piece 60 which was maintained in spaced relationship from closure means 44 by conventional means, forming annulus 61 between piece 60 and conduit 34, and annulus 62 between piece 60 and wall 65 of tunnel 12. Hence, all reactants introduced upstream of piece 60 were forced to flow in two annular streams emanating from orifices 61 and 62 in encompassing relationship to that material sprayed from nozzle 48.

The make-oil sprayed from the nozzle encompassed by the stream of reactants from the above-described orifices 61 and 62 was dispersed in a conelike configuration to form a multiphase mixture with the reactant gases.

Upon impinging upon the screen, essentially all of this multiphase mixture passed through the openings of the screen. Inasmuch as the free area of the screen through which the multiphase mixture passed was less than that area of the multiphase mixture flow area as impinged upon the screen, the effect was to increase the velocity of the mixture as it passed through the openings of the screen. However, since a considerable portion of that liquid hydrocarbon dispersed in the multiphase mixture was impinged upon the wires of the screen, this portion of the liquid hydrocarbon was further broken into droplets, these being dispersed in the multiphase mixture formed on the downstream side of the screen. This further dispersion resulted in the multiphase mixture emerging on the downstream side of the screen having the appearance of fog.

The mixture was then introduced into the reaction zone in which the hydrocarbon was vaporized and the vaporous reaction mass was subjected to carbon black forming conditions.

The first series of runs was made with about 80 percent of the total air provided to the reactor flowing through the orifices surrounding the make-oil tube. Results were as follows:

| Burner | Nozzle Only | Nozzle with Nozzle Screen |
|---|---|---|
| Oil: | | |
| Rate, g.p.h. | 149 | 151 |
| Inlet Temperature, °F. | 80 | 80 |
| Air-Gas Rates, MCFH: | | |
| Air to First Combustion Chamber | 100 | 100 |
| Air to Second Combustion Chamber | 25 | 25 |
| Gas to First Combustion Chamber | 6.7 | 6.7 |
| Gas to Second Combustion Chamber | 0 | 0 |
| Carbon Black Properties: | | |
| Photelometer | 98 | 91 |
| $N_2SA$, m.$^2$/g. | 94.5 | 66.8 |
| Oil Absorption, cc./g. | 1.67 | 1.43 |
| Yield, 0/gal. | 3.07 | 3.26 |
| Carbon Deposition | considerable | slight |

These data indicate that, whereas the deposition of undesirable carbon in the reactor was considerable when only the burner was used, the use of a burner and screen to effect the method of this invention produced only slight deposition of carbon within the reactor and, under otherwise comparable condition, produced a carbon black having considerably reduced structure and surface area at improved yields.

A second series of runs, comparable to the first series, was made, about 85 percent of the total air provided to the reactor being directed through the orifices surrounding the make-oil tube, it being desired to decrease the previously-experienced carbon formation within the reactor.

| Burner | Nozzle Only | Nozzle with screen |
|---|---|---|
| Oil: | | |
| Rate, g.p.h. | 138 | 140 |
| Inlet Temperature, °F. | 85 | 95 |
| Air-Gas Rates, MCFH: | | |
| Air to First Combustion Chamber | 100 | 100 |
| Air to Second Combustion Chamber | 15 | 15 |
| Gas to First Combustion Chamber | 6.7 | 6.7 |
| Gas to Second Combustion Chamber | 0 | 0 |
| Carbon Black Properties: | | |
| Photelometer | 95 | 90 |
| $N_2SA$, m.$^2$/g. | 84.2 | 75.4 |
| Oil Absorption, cc./g. | 1.67 | 1.49 |
| Yield, 0/gal. | 2.91 | 3.30 |
| Carbon Deposition | considerable | slight |

These data are consistent with the previous data, indicating a decrease in structure and surface area of the carbon black produced by the practice of the invention.

As discussed, the hydrocarbon oil is dispersed with the vaporous reactant in the multiphase mixture comprising the cone-shaped spray which is impinged upon a screen. While it is preferable that this vaporous reactant be comprised of a combustible mixture of air and fuel introduced from the upstream side of the screen, this vaporous reactant can be introduced on the downstream side of the screen and, in effect, aspirated to the upstream side of the screen and into admixture with liquid hydrocarbon by the aspirating effect of the spray nozzle. In either instance, aspiration into the cone impinging the screen will be adequate between spray angle nozzles of from about 15° to about 75°, preferably from about 20° to about 60°.

While the invention has been described above with particular reference to being employed in a carbon-black furnace comprising three combustion chambers as illustrated in FIG. 1, the invention is not limited thereto. The invention is applicable to other types of carbon black furnaces, e.g., those comprising less than three combustion chambers.

The invention is not to be limited to the use of aromatic concentrate oils. Other oils, such as kerosene, gasoline boiling range hydrocarbons, heavy or light naphthas or oils even heavier than recycle gas oils can be used. Such hydrocarbon materials as natural gas, either dry gas, wet or raw natural gas as it comes from a gas well, or gasoline extraction plant or refinery residue gas can be used. Further, hydrocarbons heavier than said gases can be used as charge, such as butane, pentane, or the like. Broadly, most any hydrocarbon can be used as feed in my process. However, the normally liquid hydrocarbons are preferred, and the normally liquid aromatic hydrocarbons are more preferred, because of the higher yields obtained therefrom. The feed can be injected as a liquid through a spray or atomizer, or the feed can be injected as a vapor. Hydrocarbons from other sources than petroleum likewise are suitable, as for example, low temperature coal gas, coal tar distillates, shale gases and distillates can be used. These feedstocks may contain most any class of hydrocarbon compound, as for example, saturated or unsaturated hydrocarbons, paraffins, olefins, aromatics, napthenes, or any others which might become available.

While certain embodiments of the invention have been described for illustrative purposes, the invention obviously is not limited thereto. Various other modifications will be apparent to those skilled in the art in a view of this disclosure. Such modifications are within the spirit and scope of the invention.

What is claimed is:

1. A process for the production of carbon black by the pyrolytic decomposition of a hydrocarbon feed within a reactor with hot combustion gases produced by the oxidation of a fuel with a free oxygen-containing gas which comprises:
   a. introducing a first free oxygen-containing gas into said reactor;
   b. introducing hydrocarbon feed into said reactor through a feed inlet nozzle;
   c. dispersing said hydrocarbon feed in said first free oxygen-containing gas by impinging said feed on a screen spaced apart from said inlet nozzle;
   d. passing said hydrocarbon feed and said first free oxygen-containing gas into contact with hot combustion gases produced by the oxidation of a fuel with a second free oxygen-containing gas, said hot combustion gases being introduced through the circumferential periphery of said reactor to raise the temperature of said hydrocarbon feed to carbon black forming temperatures and to form carbon black; and,
   e. recovering the carbon black.

2. The process as defined in claim 1 in which said first free oxygen-containing gas is air and is introduced into said reactor in an amount within the range of from about 10 to about 70 volume percent of the total air introduced into the process.

3. The process of claim 2 in which vaporous fuel is introduced in admixture with said air.

4. The process of claim 3 in which said hydrocarbon feed is introduced as a spray having a cone-shaped configuration.

5. The process of claim 3 in which said hydrocarbon feed is introduced into said reactor downstream of the locus of introduction of said air.

6. The process as defined in claim 4 in which said air and said fuel are introduced longitudinally into said reactor with said hydrocarbon feed spray as a plurality of streams, said air and said fuel being introduced peripherally to said hydrocarbon feed spray.